Nov. 16, 1965 MICHIHIKO OKAMURA ETAL 3,218,372
MOLDING MATERIAL AND MOLDED ARTICLES
Filed Aug. 21, 1961

INVENTORS
MICHIHIKO OKAMURA
MIKIO MATSUKANE
BY
ATTORNEY

United States Patent Office

3,218,372
Patented Nov. 16, 1965

3,218,372
MOLDING MATERIAL AND MOLDED ARTICLES
Michihiko Okamura, Matsuyama-shi, Ehime-ken, and Mikio Matsukane, Hino-machi, Minami-Tama-gun, Tokyo, Japan, assignors to Kunoshima Kagaku Kogyo Kabushiki Kaisha, Hiroshima-ken, Japan, a corporation of Japan
Filed Aug. 21, 1961, Ser. No. 132,949
8 Claims. (Cl. 260—860)

This invention relates to a molding material and the molded articles obtained therefrom. More particularly, the invention relates to a molding material comprising substantially 95 to 5% by weight of a polycarbonate derived from 4,4' - dihydroxy - di(mononuclear aryl)-alkane and 5 to 95% by weight of polyalkylene terephthalate, and the molded articles obtained therefrom.

Heretofore, the method of preparing polyalkylene terephthalate from terephthalic acid or dialkyl terephthalate and alkylene glycol has been made known by the British patent specification No. 578,079. And it is known that ployalkylene terephthalate is a thermoplastic material having a wealth of excellent properties which include its high melting point of above about 230° C., its insolubility in practically all solvents, its water resistance, and its resistance to heat as well as to oxidation; and that from its melted state fibers and films having good physical and chemical properties are obtainable. However, from the structural standpoint, with its crystallinity being very great, polyalkylene terephthalate, during periods of long storage, loses its ductility, this phenomenon being especially noticeable at high temperatures. In consequence, the uses of polyalkylene terephthalate have been restricted to films and fibers, and its use as a molding material is as yet undeveloped.

On the other hand, the polycarbonate derived from 4,4'-dihydroxy-di(mononuclear aryl)-alkane is known as a resin possessing high impact strength as well as excellent electrical properties and heat stability. Moreover, it generally is characterized in that its crystallinity is strongly impeded and that even at high temperatures no changes in its physical properties occur. Thus, its uses cover a wide area, it not only being used for films and fibers but also a greater part of its use is as a molding material.

However, due to the fact that the viscosity of the polycarbonate derived from 4,4'-hydroxy-di(mononuclear aryl)-alkane in its melted state is very high as compared with the conventional thermoplastic materials, difficulties are frequently encountered during its molding operations. Especially, in case of the high molecular weight polycarbonate there is the drawback that it is subject to great limitations in its molding operations on account of this high viscosity.

As the methods of preparing polycarbonates there can be given the phosgenation method in which phosgene is blown into 4,4'-dihydroxy-di(mononuclear aryl)-alkane in the presence of an aqueous solution of a caustic alkali and a solvent, and the ester-interchange method in which the polycarbonate is prepared by effecting the ester interchange of 4,4'-dihydroxy-di(mononuclear aryl)-alkane and the diester of carbonic acid, the particulars thereof being disclosed, for example, in the British patent specification No. 772,627. In the present invention the polycarbonate derived from 4,4'-dihydroxy-di(mononuclear aryl)-alkane by the methods such as these will be hereinafter referred to as merely polycarbonate.

Heretofore it has been held that polycarbonate in molten state is not miscible with uniformity with any other polymer. However, we found that polycarbonate is miscible with polyalkylene terephthalate at any ratios with uniformity.

We found however that the resin composition comprising substantially 95 to 5% by weight of polycarbonate and 5 to 95% by weight of polyalkylene terephthalate not only rendered the molding operations easier on account of the lower melt viscosity as compared with the instance when polycarbonate was used singly, but also with the ductility becoming higher than in the case of the use of polyalkylene terephthalate singly, a molded article excelling greatly in their physical and chemical as well as electrical properties was obtained.

Accordingly, an object of the invention is to provide a readily molded material which gives molded articles having excellent physical and chemical as well as electrical properties.

Another object of the invention is to provide molded articles which possess the excellent properties as described hereinabove.

Other objects and advantages of the invention will be apparent from the following detailed description thereof.

While the polycarbonate to be used in the present invention may be any of the polycarbonates that are derived from 4,4' - dihydroxy-di(mononuclear aryl)-alkane, in order to obtain as the finished molded article that which excels in its physical and chemical as well as electrical properties, it is preferred to select that in which the intrinsic viscosity $[\eta]$ is 0.46–1.2. The intrinsic viscosity of polycarbonate as used in the present invention is a standard by which the degree of polymerization of the polycarbonate is indicated, and is a value that is defined by the formula $$[\eta] = \lim_{C \to 0} \frac{\eta_r - 1}{C}$$

wherein $\eta_r$ is the ratio at 20° C. of the viscosity of a dilute solution of the polycarbonate dissolved in methylene chloride to the viscosity of the methylene chloride itself and C represents the concentration of the dilute solution, the unit being the number of grams of the polycarbonate in 100 cc. of the solution.

On the other hand, as for the polyalkylene terephthalate to be used in the invention, from similar considerations as in case of the above-mentioned polycarbonate those whose intrinsic viscosity $[\eta]$ is 0.50–0.85 are preferred. In case of the intrinsic viscosity $[\eta]$ of the polyalkylene terephthalate, it is the value calculated in accordance with the aforementioned formula on the basis of a value determined at 25° C. using as the solvent a mixed solution of phenol and tetrachloroethane in a proportion of 60% by weight of the former to 40% by weight of the latter.

The molding material according to the invention is obtained by mixing together uniformly 95 to 5% by weight of the aforementioned polycarbonate with 5 to 95% by weight of polyalkylene terephthalate while the two are in a melted state. In mixing the two, at a time when either the aforementioned polycarbonate or the polyalkylene terephthalate is in a melted state immediately after its reaction, the other polymer may be added either in its solid or melted state and the mixing be performed until a uniform mixture is obtained. Or, the two which are both in pellet form or in which one is in powdered form and the other in pellet form may be mixed in advance in their solid states and thereafter placed in a reaction vessel to be melted and mixed therein. In all cases the melting must be carried out in a nitrogen atmosphere, and the mixing temperature must at least be higher than the melting point of the polyalkylene terephthalate used, because generally the melting point of polyalkylene terephthalate is higher than that of the polycarbonate. Hence, the mixing is preferably performed normally in the range of 250 to 290° C.

Moreover, if necessary, one or more types of stabilizers having a stabilizing effect with respect to both the polycarbonate and the polyalkylene terephthalate, and pigments as well as fillers may be added in suitable quantities during the mixing operation. As this type of stabilizer, there can be cited, for example, phosphorous acid and triphenyl phosphite; and as pigments and fillers, for example, carbon black, titanium white, alumina, silica, asbestos, etc.

The reason why, in accordance with the invention, 5 to 95 parts by weight of the polyalkylene terephthalate is mixed with 95 to 5 parts by weight of the polycarbonate is as follows:

As already described, in spite of the fact that polycarbonates have high impact strength and resistance to heat with moreover excellent electrical properties, it has a drawback in that its molding operations are difficult because of its high melt viscosity. However, the melt viscosity of the mixture obtained by mixing 95 parts by weight or less of polycarbonate with 5 parts by weight or more of polyalkylene terephthalate falls to less than about $\frac{1}{7}$ of that of polycarbonate alone, thus making the molding operations very easy to perform while retaining as ever the excellent physical and chemical as well as electrical properties of the polycarbonate used singly. On the other hand, when to 95 parts by weight or less of polyalkylene terephthalate 5 parts by weight or more of polycarbonate is added and mixed the hardness and tensile strength of the molded article produced from the mixture obtained is enhanced and moreover the electrical properties are also improved as compared with polyalkylene terephthalate.

In particular, the resin composition comprising substantially 95–70 parts by weight of a polycarbonate having an $[\eta]=0.46$–$1.2$ and 5–30 parts by weight of a polyalkylene terephthalate having an $[\eta]=0.50$–$0.85$ is very suitable as a molding material for use in either injection molding, extrusion molding or compression molding. A molding material such as this has a melt viscosity that is suited to molding operations, and the molded articles obtained therefrom are usually transparent and moreover excel greatly in their hardness, tensile strength, impact strength, resistance to heat and electrical properties. If, in this instance, it is desired to obtain a transparent product, it is preferred that quenching be performed, if possible, during molding.

On the other hand, while in the instance of the resin composition obtained by the uniform mixing of at least 5 but less than 70 parts by weight of the polycarbonate with at most 95 but more than 30 parts by weight of the polyalkylene terephthalate generally the influence of the polyalkylene terephthalate is more predominant than that of the polycarbonate, in such a case, by forming thin products or effecting stretching after molding, i.e., forming stretchable molded articles, the desirable properties of the polycarbonate are imparted to the polyalkylene terephthalate, and thus the impact strength, tensile strength and the electrical properties can be improved without sacrificing the various desirable properties of the polyalkylene terephthalate. However, when stretching is performed after molding, as in this case, it is preferred that subsequent to the stretching heat treatment be performed at a temperature higher than the temperature at which stretching was performed.

Thus the molding material of the present invention is such that any of the molding means that can possibly be applied to melted polymers such as extrusion molding, injection molding and compression molding can be adopted. Particularly, the resin composition according to the invention that is obtained by mixing 95 to 70 parts by weight of the polycarbonate with 5 to 30 parts by weight of polyalkylene terephthalate can be applied any of the molding methods, namely injection molding, compression molding and exrusion molding. And by these methods molded articles of any known shape can be produced. Stretching may, of course, be performed depending on the type of the molded article.

However, in case of the resin composition of the invention that is obtained by mixing at least 5 but less than 70 parts by weight of the polycarbonate with at most 95 but more than 30 parts by weight of polyalkylene terephthalate, it is preferred that, if possible, molded articles capable of being imparted stretching or thin products be produced. Hence, in this case, films, fibers, wire coverings are particularly suitable products to be produced from this type of resin composition.

The following examples will better illustrate the nature of the present invention; however, the invention is not intended to be limited thereto.

EXAMPLE 1

(A) *Preparation of polyethylene terephthalate*

To dimethyl terephthalate, and ethylene glycol in an amount 2.2 mol times the dimethyl terephthalate was added 0.05% of zinc acetate based on the polyester formed, following which the ester-interchange reaction was carried out for 2 hours at 180–190° C. and at normal pressure. This was followed by effecting the condensation polymerization reaction for 4 hours in a cylindrical vessel of special steel, the bath temperature being 280° C. and the pressure, 0.5 mm. Hg, whereby polyethylene terephthalate was obtained.

(B) *Preparation of the polycarbonate*

(a) *Preparation by the phosgenation method.*—Into 4,4'-dihydroxy-diphenyl-2,2-propane was blown at 25° C. within 2 hours phosgene (1.16 mol times the 4,4'-dihydroxy-diphenyl-2,2-propane) in the presence of a 9.8% aqueous solution of caustic soda (the quantity of the caustic soda being 2.8 mol times the 4,4'-dihydroxy-diphenyl-2,2-propane) and methylene chloride. After completion of the blowing in of the phosgene, the reaction was continued with stirring for another 4 hours. After washing the resultant polymer solution with water, the methylene chloride was evaporated therefrom, whereby was obtained a powdered polycarbonate.

(b) *Preparation by the ester-interchange method.*—To a mixture of 4,4'-dihydroxy-diphenyl-2,2-propane, and diphenyl carbonate in an amount 1.10 mol times the 4,4'-dihydroxy-diphenyl-2,2-propane was added as a catalyst 0.08% of manganous borate based on the weight of the 4,4'-dihydroxy-diphenyl-2,2-propane, following which the mixture was heated in a stream of nitrogen to 170–200° C., the pressure reduced to 50 mm. Hg, and the phenol formed distilled off. Then the reaction temperature was raised to 220–240° C.; the reaction was made to proceed at 300 mm. Hg for 30 minutes and at 15 mm. Hg for 15 minutes, and the excess diphenyl carbonate was gradually distilled off. Finally, the reaction temperature was raised to 280°–290° C., and the reaction continued at 1 mm. Hg for about 3 hours, thereby completing the condensation polymerization reaction and obtaining a polycarbonate.

(C) *Preparation of the resin composition*

The polyethylene terephthalate pellet obtained as described in (A) above and having an intrinsic viscosity $[\eta]$ of 0.77 and the polycarbonate powder obtained as described in (B)(a) and having an intrinsic viscosity $[\eta]$ of 0.67 were placed in a melting mixer in various combination of their proportions, and while passing nitrogen gas thereover were melted by heating to 290° C. under normal pressure. The melted materials were mixed uniformly by blending with stirring. Then the mixed and melted materials were made into pellets in accordance with accepted practices, and thus were obtained the molding materials.

With respect to these molding materials obtained as above, in FIG. 1 is shown the relationship between their blend ratios and their apparent melt viscosities (measured in a flow tester of 100 kg./cm.² pressure with a nozzle 1ϕ x 10 mm.) at 280° C.

From FIG. 1, it can be observed that the melt viscosity falls strikingly immediately upon mixing polyethylene terephthalate in the polycarbonate, and that by mixing 95 parts by weight of the polycarbonate with 5 parts by weight of polyethylene terephthalate the melt viscosity of this mixture falls to about 1/7 of that of the polycarbonate.

Next, the physical properties of the molded articles molded at 280°–290° C. from the aforementioned molding materials using a plunger type injection machine were measured, the atmosphere in which measurements were made being 20° C. and 60% R.H.

Figure 4:
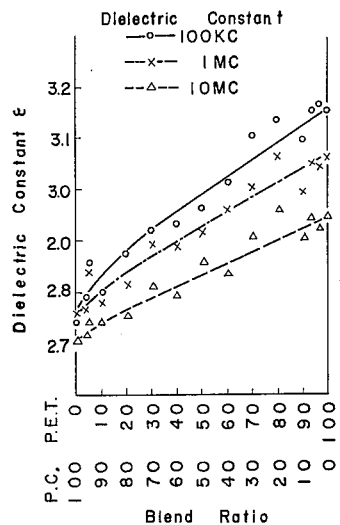

In FIG. 4 are shown the values of the dielectric constant ε obtained by measuring sample pieces 50ϕ x 2 mm. using a Q meter.

Figure 2:
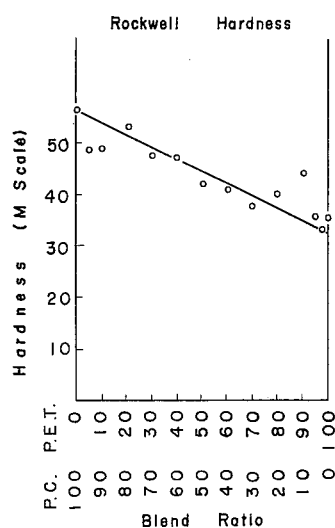
FIG. 2 shows the results of measurements of specimens 3.6 x 1 x 1/8 inch using a Rockwell hardness tester.

From FIG. 2, it can be seen that the hardness increases in proportion as the polycarbonate is added to the polyethylene terephthalate.

Figure 1:
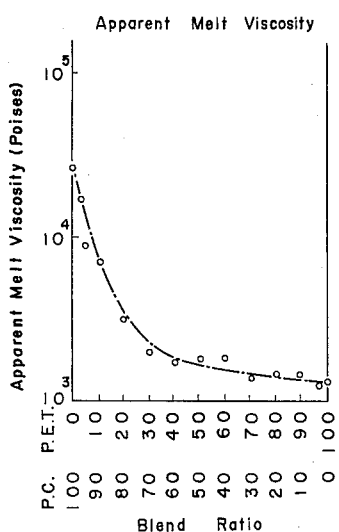
Figure 3:
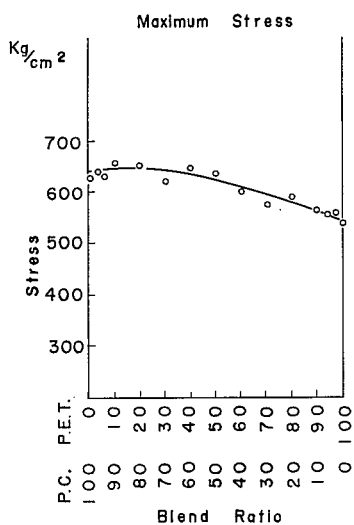
FIG. 3 shows the tensile strengths obtained from tests which were carried out using dumb-bell specimens having 4 cm. gauge length and an Instron tester with the extension rate of 2 cm. per minute according to JIS.

From FIG. 3, it can be seen that in spite of the fact that the melt viscosity drops strikingly upon mixing of polyethylene terephthalate with the polycarbonate (see FIG. 1), the tensile strength shows hardly any decline, and that the tensile strength increases in proportion as the polycarbonate is mixed with the polyethylene terephthalate.

From FIG. 4, it can be seen that in proportion as the polyethylene terephthalate is mixed in the polycarbonate the dielectric constant increases.

EXAMPLE 2

45.6 parts of 4,4'-dihydroxy-diphenyl-2,2-propane and 48 parts of diphenyl carbonate were used as the starting material, and to this was added 0.045 part of manganous borate as the catalyst, following which the mixture was reacted in a nitrogen stream as described in (B)(b) of Example 1, whereby was synthesized a polycarbonate having an $[\eta]=0.61$. This was followed by introducing nitrogen gas into the reaction vessel, and after making the pressure normal and while maintaining a temperature of 290° C., 12 parts of the polyethylene terephthalate pellets whose $[\eta]=0.82$ prepared by the method described in (A) of Example 1, in the state as prepared, were cast into the reaction vessel and with stirring mixed uniformly. Next, this was worked up into pellet form in accordance with accepted practices, and thus the molding material was obtained. By way of example, when this molding material was compression molded using a compression machine used commonly for synthetic resin by heating at 210° C. for 15 minutes followed by lowering the temperature to 150° C. and molding with a pressure of 500 kg./cm.², a molded article was obtained having excellent impact strength as well as being solvent.

Since the melt viscosity of this molding material was reduced to about 1/10 of that of the case when the polycarbonate is used singly as a molding material, the injection molding of it was very readily performed.

EXAMPLE 3

To 194 parts of dimethyl terephthalate were added 136.5 parts of ethylene glycol and as the catalyst 0.06 part of zinc acetate. The mixture was heated to 195° C. in a nitrogen stream with thorough stirring, thereby distilling off completely the methanol formed. This ester-interchange reaction was completed in about 4 hours.

When the thus obtained lower molecular polymer was transferred to a polymerization vessel, 0.06 part of antimony trioxide was added, and the polymerization was continued for about 9 hours in a stream of nitrogen with vigorous stirring while reducing the pressure to below 1 mm. Hg and raising the temperature to 280° C. thereby distilling off completely the ethylene glycol, a polyethylene terephthalate whose $[\eta]=0.65$ was obtained.

Next, the inside of the reaction vessel was returned to normal pressure with nitrogen gas, and 192 parts of the polycarbonate powder prepared by the method described in (B)(a) of Example 1, in the state as prepared, were cast into the reaction vessel, following which the mixture was mixed uniformly with stirring.

Then this melted mixture was worked up into pellets in accordance with accepted practices, and thus the molding material was obtained.

The molding material obtained, as described hereinabove, was molded into monofilaments using an extruder having a screw of constant inclination and pitch, a compression ratio of 1.9 and L/D of 15 by extruding through a die at 250°–260° C., the cylinder temperature being 280°–290° C., and about one second later quenching with water of 20°–30° C. for about 2 seconds.

While it is difficult to mold by means of extrusion polyethylene terephthalate by following the same operations as in the present sample, the tensile strength of the molded articles obtained by the present example surpassed that of that obtained from the molding material which consists of polyethylene terephthalate alone.

Having thus described the invention, what is claimed is:

1. A polymer composition to be used for molding purposes comprising substantially 95–5% by weight of a polycarbonate which is the product of condensing at least one 4,4'-dihydroxy-di(mononuclear aryl)-alkane with a carbonic acid derivative selected from the group consisting of phosgene and carbonic acid diester and 5–95% by weight of a polyalkylene terephthalate, said polycarbonate having an intrinsic viscosity of 0.46–1.2 (the unit of concentration being gram/100 cc.) based on a value measured at 20° C. with methylene chloride as the solvent and said polyalkylene terephthalate having an intrinsic viscosity of 0.5–0.85 (the unit of concentration being gram/100 cc.) based on a value measured at 25° C. with the solvent being a mixed solvent of phenol and tetrachloroethane in a proportion of 60 parts by weight of the former to 40 parts by weight of the latter.

2. A molding material for general molding use as defined in claim 1 comprising substantially 95 to 70% by weight of said polycarbonate and 5 to 30% by weight of said polyalkylene terephthalate, said polycarbonate having an intrinsic viscosity of 0.46–1.2 (the unit of concentration being gram/100 cc.) based on a value measured at 20° C. with methylene chloride as the solvent, and said polyalkylene terephthalate having an intrinsic viscosity of 0.5–0.85 (the unit of concentration being gram/100 cc.) based on a value measured at 25° C. with the solvent being a mixed solvent of phenol and tetrachloroethane in a proportion of 60 parts by weight of the former to 40 parts by weight of the latter.

3. A molding material to be used for thin products and molded articles capable of being stretched as defined in claim 1 comprising substantially at least 5% but less than 70% by weight of said polycarbonate and at most 95% but more than 30% by weight of said polyalkylene terephthalate, said polycarbonate having an intrinsic viscosity of 0.46–1.2 (the unit of concentration being gram/100 cc.) based on a value measured at 20° C. with methylene chloride as the solvent and said polyalkylene terephthalate having an intrinsic viscosity of 0.5–0.85 (the unit of concentration being gram/100 cc.) based on a value measured at 25° C. with the solvent being a mixed solvent of phenol and tetrachloroethane in a proportion of 60 parts by weight of the former to 40 parts by weight of the latter.

4. A molding material as defined in claim 1, wherein said polyalkylene terephthalate is polyethylene terephthalate.

5. A molding material as defined in claim 1, wherein said 4,4'-dihydroxy-di(mononuclear aryl)-alkane is 4,4'-dihydroxy-diphenyl-2,2-propane.

6. The molding material as defined in claim 1 wherein a small quantity of a stabilizer is further added and mixed.

7. The molding material as defined in claim 1 wherein a small quantity of a pigment is further added and mixed.

8. The molding material as defined in claim 1 wherein a small quantity of a filler is further added and mixed.

References Cited by the Examiner

UNITED STATES PATENTS

| | | | |
|---|---|---|---|
| 2,789,971 | 3/1957 | Reynolds et al. | 260—77.5 |
| 3,000,849 | 9/1961 | Clachan et al. | 260—30.4 |

SAMUEL H. BLECH, *Primary Examiner*

LEON J. BERCOVITZ, MURRAY TILLMAN,
*Examiners.*